Figure 1:
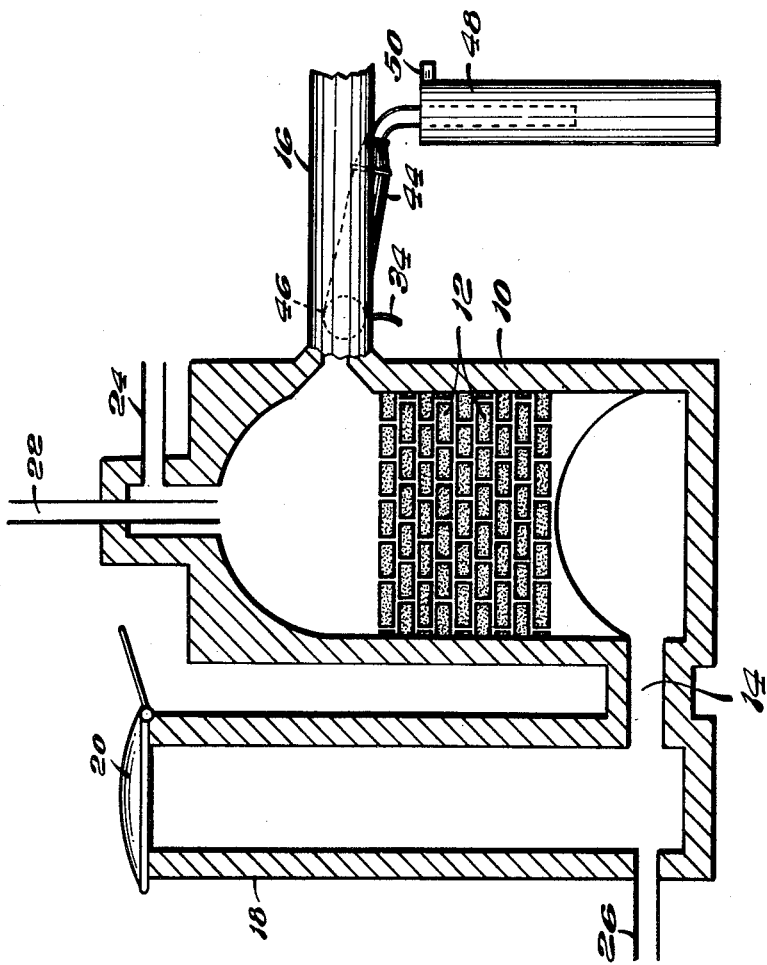

Dec. 21, 1954     H. I. ABBOUD     2,697,591
APPARATUS FOR QUENCH COOLING

Filed Sept. 25, 1952     2 Sheets-Sheet 1

Inventor
Harry I. Abboud.

United States Patent Office 2,697,591
Patented Dec. 21, 1954

2,697,591

APPARATUS FOR QUENCH COOLING

Harry I. Abboud, Franklin, La., assignor to Godfrey L. Cabot, Inc., Boston, Mass., a corporation of Massachusetts Application September 25, 1952, Serial No. 311,513

5 Claims. (Cl. 261—116)

This invention relates to apparatus for cooling the effluents from cyclically operated reactors. More particularly it comprises a new and improved quenching device including a retractable spray nozzle adapted for trouble-free use when exposed to elevated temperatures.

While this invention has a wide field of use it will be illustrated and described in its application to the production of carbon black by thermal decomposition of hydrocarbons.

In the thermal process as described, for example, in U. S. Patent No. 1,520,115, Brownlee and Uhlinger, a furnace containing refractory checkerwork is heated to 1200–1400° C. by burning therein a mixture of gas and air. Thereafter the heating is discontinued and hydrocarbon gas is introduced to flow through the checkerwork where it is dissociated to carbon black and hydrogen-rich gases. The effluents, including the entrained carbon black, then pass through a spray cooling tower to suitable collection apparatus. When the refractory checkerwork of the furnace has become too cool for efficient thermal dissociation the flow of hydrocarbon gas is discontinued and the refractory is reheated, all in continuous cyclical repetition.

It has been found that a number of disadvantages attend the use of a spray tower such as that described in the above patent. The principal disadvantage is the high loss of suspended particles in the sump, the statements in the patent implying the contrary notwithstanding. When the effluent gases are heavily loaded, as is the case in the production of thermal carbon blacks, a very significant amount of solids drop out by reason of the abrupt change in direction of flow from the reactor up into the tower. Additionally, the drops of spray water which are not vaporized knock out a further amount of the solid particles and these are carried to the sump.

Another disadvantage is that effluent must be withdrawn from the bottom of the reactor, thus, in the case of thermal carbon black production, requiring the refractory in the bottom of the reactor which bears the heaviest load to be subjected to the greatest heat. This requirement limits the amount of heat that can be stored in the refractory during the heating cycle and results as well in shorter refractory life.

By the use of the improved quenching device of my invention the above disadvantages are obviated. The product may be withdrawn from the top of the reactor and, most importantly, conducted in straight line flow from the reactor to cyclone separators. The cooling spray nozzle being retractable, it is not exposed to the high temperature heating flame as would be the case if the product take-off or outlet flue entered the top of a cooling tower. Thus, the refractory in the reactor can be heated from the top downward thereby making possible the use of higher temperatures and increasing refractory life.

It is the principal object of this invention to provide an improved quenching device for a high temperature reactor.

Another object is to provide an improved quenching device so constructed and arranged that it may be located immediately adjacent the reactor.

Another object is to provide a flue quench in which the flow of water into the flue may be discontinued when no product is flowing therethrough although the flue is subject to high temperatures.

Another object is to provide mechanically operated means for removing the water spray nozzle from the high temperature zone when cooling is not required.

Going more into detail, the apparatus of my invention includes a refractory lined flue leading from the top of the furnace and a retractable spray nozzle extending into the flue at a point close to the furnace outlet. Fluid pressure means are provided for withdrawing the spray nozzle into an offtake duct or cylinder well insulated from the reactor during the heating cycle. Means are also provided for purging the spray nozzle during the heating cycle or, alternatively, for providing a dribble of water through the nozzle and for disposing of the dribble water. The object of these latter means is the same, namely, to prevent the spray nozzle from becoming clogged with salts or other impurities commonly formed in most unpurified water used for cooling purposes. The spray head may be of any suitable type and is preferably directed downstream during use.

In operation the apparatus of my invention functions as follows. At the end of the heating cycle and as the make or dissociation cycle commences the spray nozzle is projected into the cooling flue and the flow of high pressure cooling water is commenced. The water spray is continued during the make cycle and may be continued during an inert gas purge cycle following the make cycle. Thereafter the spray nozzle is withdrawn from the flue prior to commencement of the heating cycle. Upon withdrawal of the nozzle the flow of high pressure water is stopped and either a dribble flow of water is continued or a short or continuous flow of gas or vapor is passed through the nozzle to clear out the water and keep the nozzle cool, if necessary. When the dribble is used means are provided, as by a water seal and drain for disposing of the water and preventing it from flowing into the cooling flue.

Figure 2:
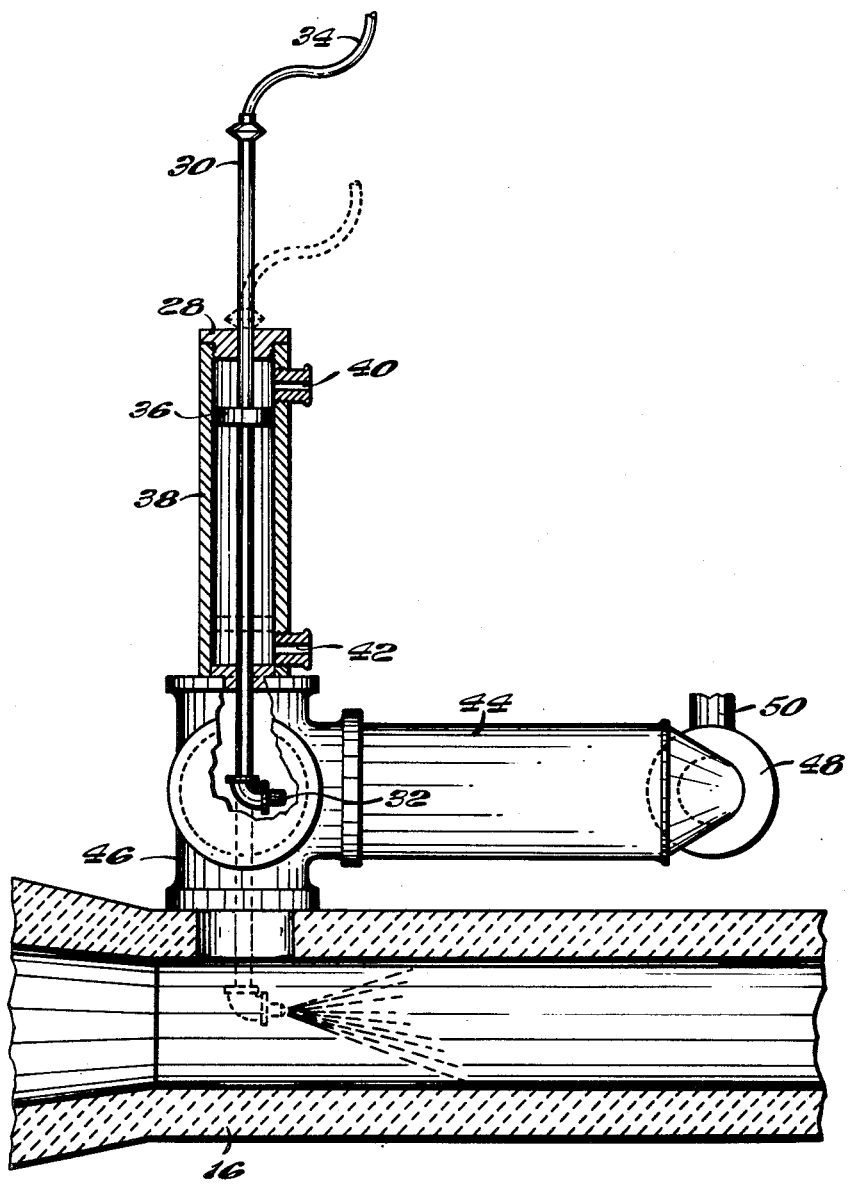

These and other features of the invention will best be understood and appreciated from the following description of a preferred embodiment thereof selected for purposes of illustration and shown in the accompanying drawings, in which:

Fig. 1 is a view in side elevation, partly in section, of apparatus for producing thermal carbon black showing the spray device of my invention in position, together with dribble takeoff connections, and Fig. 2 is a plan view, partly in section, of the spray device of my invention shown in operative relation to the outlet flue of the reactor or furnace.

Referring first to Fig. 1, the illustrated thermal carbon black producing apparatus consists of a reactor or furnace 10 partially filled with refractory checker brick 12, a refractory lined connecting flue 14 and an insulated outlet flue 16, stack 18 equipped with a valve 20, fuel gas and air supply pipes 22 and 24, entering the upper end of the furnace; and make gas pipe 26 leading into the bottom of the stack 18. The operation of the reactor is cyclical. The checker brick 12 is heated by a flame supplied from pipes 22 and 24 and the combustion products are drawn off through the connecting flue 14 and stack 18, valve 20 being then open. When the brick has been heated the combustion gases are cut off, the reactor is purged with hydrogen, stack valve 20 is closed and a hydrocarbon make gas is introduced into the reaction space through pipe 26 and connecting flue 14. The product gases with carbon black suspended therein are conducted out of the reactor through the outlet flue 16 to conventional cyclone separators and bag filter (not shown).

Positioned in the outlet flue 16, as close as possible to the outlet from reactor 10, is shown the novel spray device of my invention. It has been found that when the spray nozzle is allowed to remain fixed in position in flue 16 it is destroyed by the heat from the flame during the heating cycle. As no gases flow through the outlet flue 16 during this heating cycle no cooling water can be delivered to the spray nozzle because water cannot be then satisfactorily disposed of in the flue.

Consequently, I have provided a novel spray nozzle which may be inserted into flue 16 during the carbon black make cycle and withdrawn during the heating cycle. As shown in Fig. 2 the device comprises a water pipe 30 of metal having a spray nozzle 32 of conventional design on its inner end and a flexible hose 34 connected to its outer end. Secured around the pipe 30 at a convenient point intermediate its ends is a piston 36 arranged to reciprocate within an enclosing cylinder 38 having a stuffing box 28 at its outer end and connected to the flue 16 at its inner end through the medium of a T coupling 46. Ports 40 and 42, having suitable couplings are provided in the wall of cylinder 38 adjacent its ends and through these ports air, water or other suitable fluid may be introduced and withdrawn to actuate piston 36.

Because most water used commercially for cooling purposes contains large amounts of salts and other impurities which, if allowed to stand in the spray nozzle, would quickly plug it, it is necessary either to purge the spray with a gas or continue a slow flow or dribble of water. In the embodiment of the apparatus illustrated I make additional provision for disposing of the dribble water. This consists of a sloping drain 44 connected to one outlet of the T coupling 46 through which pipe 30 passes, and to which the cylinder 38 is connected. Drain 44 empties into a water seal 48 of conventional design having an overflow pipe 50.

The novel spray device of my invention is operated as follows: During the heating cycle the pipe 30 is fully retracted, nozzle 32 being drawn into T coupling 46. Water is dribbled continuously from the nozzle and flows through drain 44 into water seal 48. As the carbon black make cycle is commenced the spray is projected into the outlet flue 16 to the position shown in dash lines by forcing a hydraulic fluid into cylinder 38 through the outer port 40, the port 42 being meanwhile open for discharge. When the spray nozzle is in position high pressure water is delivered thereto and an ample spray delivered concurrently in the outlet flue 16 thus cooling the reactor effluent passing through the flue to the carbon black separators. The high pressure water spray is continued so long as the make cycle continues and until heating of the checkerwork is recommenced. It will be apparent that the piston 36 which controls the position of the spray nozzle 32 may be operated by remote controls at a comfortable distance from the furnace.

Instead of dribbling water through the spray nozzle 32 it may be purged with a short or continuous flow of gas or vapor, in which case the T coupling, drain and water seal may be eliminated. When such procedure is followed a well may be provided in the wall of flue 16 into which nozzle 32 can be withdrawn and thus be protected from the high temperature heating flame.

Having thus disclosed my invention and described in detail an illustrative embodiment thereof, I claim as new and desire to secure by Letters Patent:

1. Quenching apparatus for hot gases, comprising in combination an insulated flue having an opening through the side wall thereof, an elongated pipe aligned with said opening and movable therethrough, a spray nozzle secured to one end of said pipe and a flexible conduit adapted to supply water thereto secured to the other end thereof, means to cause longitudinal movement of said pipe in a predetermined path through said opening to introduce or withdraw the spray nozzle, and means to prevent the escape of gases past the movable pipe.

2. Apparatus for quench cooling hot gases comprising in combination an insulated flue, a conduit connected into the side thereof at its upstream end, an elongated metal water pipe centered in said conduit and guided thereby for limited longitudinal movement into and out of said flue, and a spray nozzle carried by the pipe and a flexible hose leading to the pipe, means to reciprocate said water pipe through said conduit and into and out of said flue pipe, and sealing means to prevent the passage of gases from the flue past the water pipe.

3. The apparatus as described in claim 2 in which the means to reciprocate the water pipe consists of a cylinder having a port at each end, means to supply a fluid under pressure to either port and a piston in said cylinder secured around the water pipe.

4. The apparatus as described in claim 2 in which the flexible hose connected to the water pipe is employed to supply water under high pressure and at a high rate of flow when the pipe is in its fully extended position and to supply a purge gas upon withdrawal of the pipe from the flue.

5. Apparatus for quench cooling the effluent from a cyclically operated thermal carbon black reactor, comprising in combination, an insulated flue connected into the top of the said reactor, a conduit connected into the side wall of said flue adjacent the reactor, a cylinder axially aligned with and connected to said conduit and having a port at each end and a piston therein, a metal water pipe passing axially through the cylinder and piston, being secured to the piston and adapted to be reciprocated in said conduit and into said flue pipe, a spray nozzle secured to the internal end of said water pipe and a flexible hose secured to its external end, a drain pipe connected into said conduit and a water seal at the discharge end of the drain, means to supply water under pressure to the water pipe when extended into the flue pipe and also when the water pipe is retracted into the conduit, means to prevent leakage to and from the cylinder around the water pipe, and means to supply a fluid under pressure to either of the ports in said cylinder.

References Cited in the file of this patent

UNITED STATES PATENTS

| Number | Name | Date |
|---|---|---|
| 2,184,185 | Gerhold | Dec. 19, 1939 |
| 2,597,992 | Heller | May 27, 1952 |

FOREIGN PATENTS

| Number | Country | Date |
|---|---|---|
| 127 of 1884 | Great Britain | Jan. 1, 1884 |